(No Model.)

J. RAPIEFF.
CARRIAGE FOR PNEUMATIC GUNS.

No. 515,018. Patented Feb. 20, 1894.

6 Sheets—Sheet 1.

(No Model.)

J. RAPIEFF.
CARRIAGE FOR PNEUMATIC GUNS.

No. 515,018. Patented Feb. 20, 1894.

6 Sheets—Sheet 2.

Fig. 2.

WITNESSES:
Arthur Frantzen
Margaret Spencer

INVENTOR
John Rapieff.
BY
Henry F. Parker
ATTORNEY

THE NATIONAL LITHOGRAPHING COMPANY,
WASHINGTON, D. C.

(No Model.) 6 Sheets—Sheet 5.
J. RAPIEFF.
CARRIAGE FOR PNEUMATIC GUNS.

No. 515,018. Patented Feb. 20, 1894.

WITNESSES:
INVENTOR
John Rapieff
BY Henry F. Parker
ATTORNEY (No Model.) 6 Sheets—Sheet 6.
J. RAPIEFF.
CARRIAGE FOR PNEUMATIC GUNS.
No. 515,018. Patented Feb. 20, 1894.
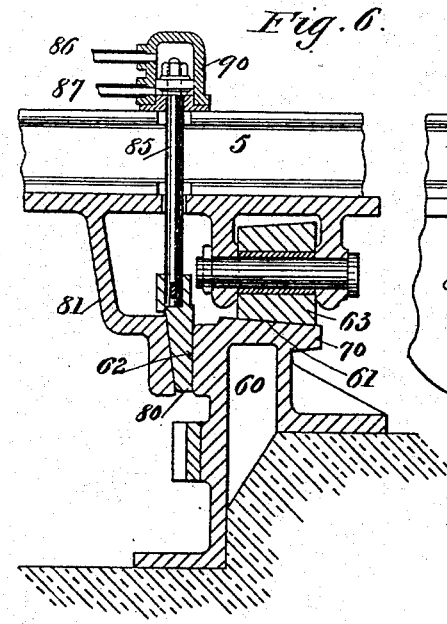
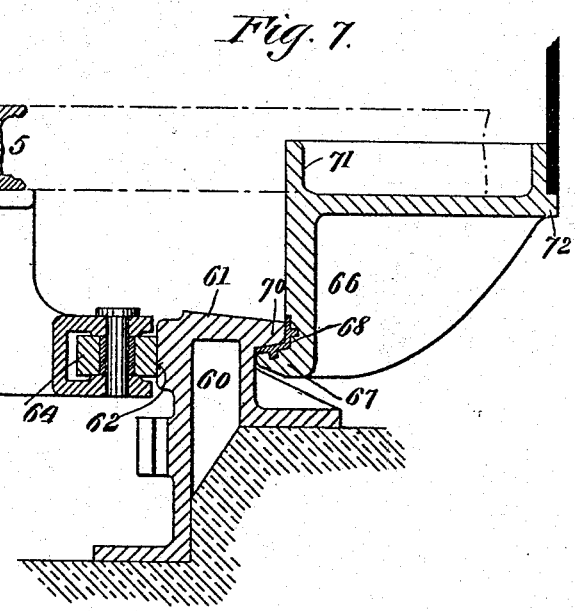
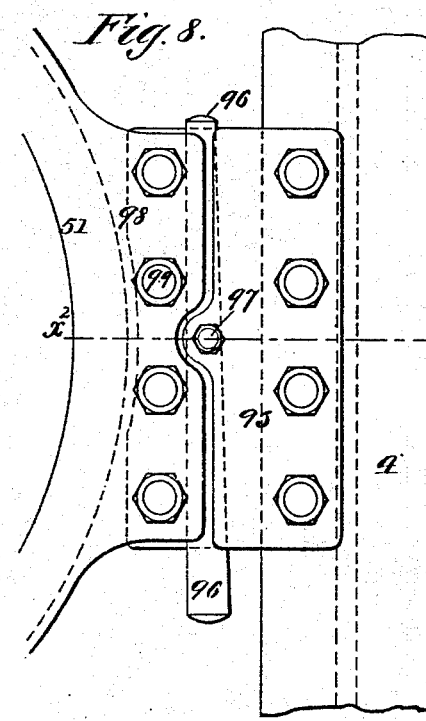
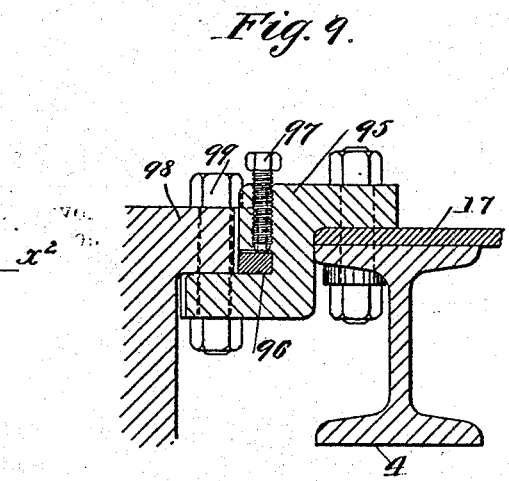
WITNESSES:
INVENTOR
John Rapieff
BY
Henry F. Parker
ATTORNEY

UNITED STATES PATENT OFFICE.

JOHN RAPIEFF, OF NEW YORK, N. Y.

CARRIAGE FOR PNEUMATIC GUNS.

SPECIFICATION forming part of Letters Patent No. 515,018, dated February 20, 1894.

Application filed July 26, 1890. Renewed April 8, 1893. Serial No. 469,600. (No model.)

*To all whom it may concern:*

Be it known that I, JOHN RAPIEFF, a subject of the Emperor of Russia, residing in the city, county, and State of New York, have invented a certain new and Improved Carriage for Pneumatic Guns, of which the following is a specification, reference being had to the accompanying drawings, in which—

Figure 1:
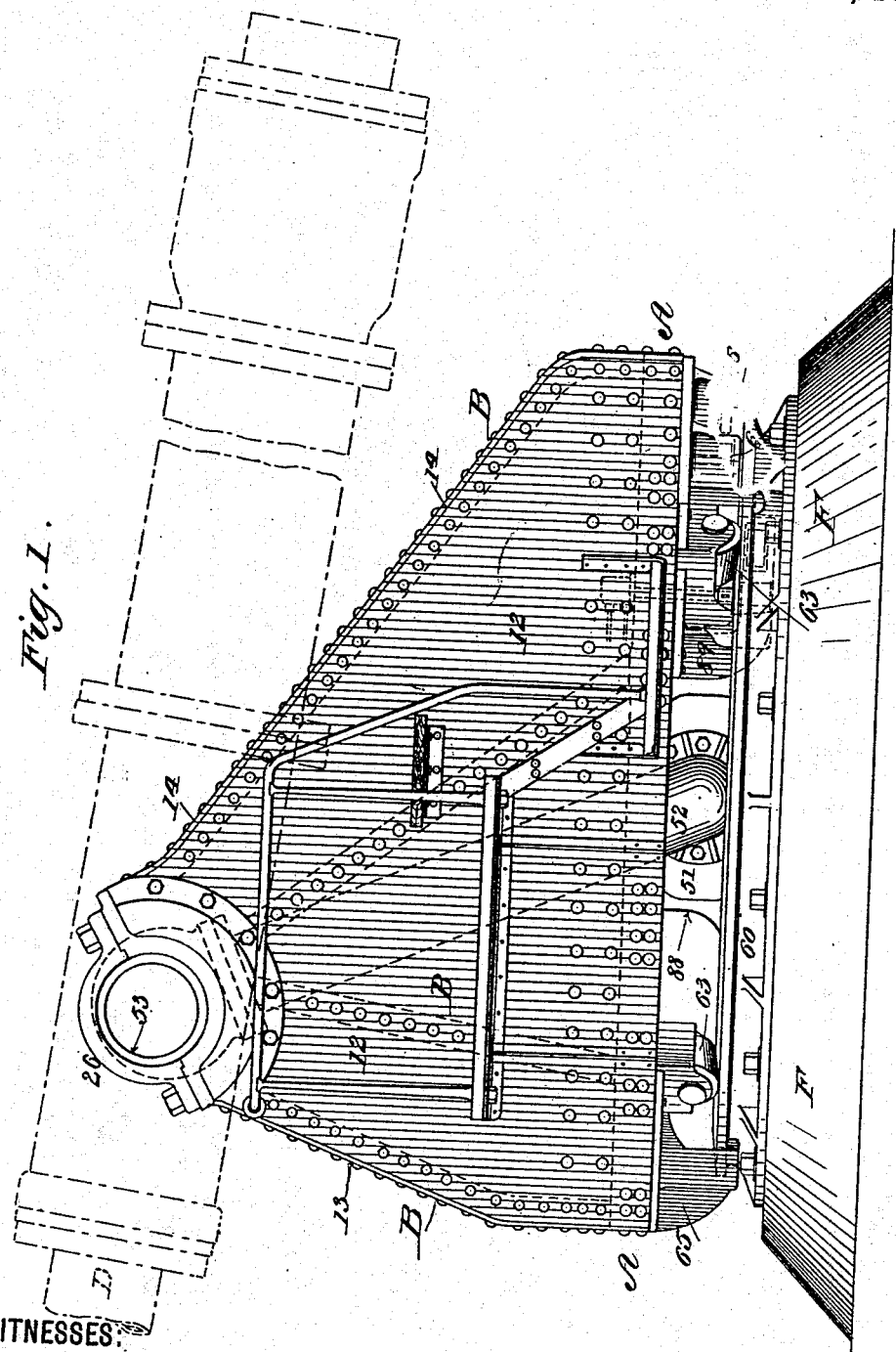
Figure 3:
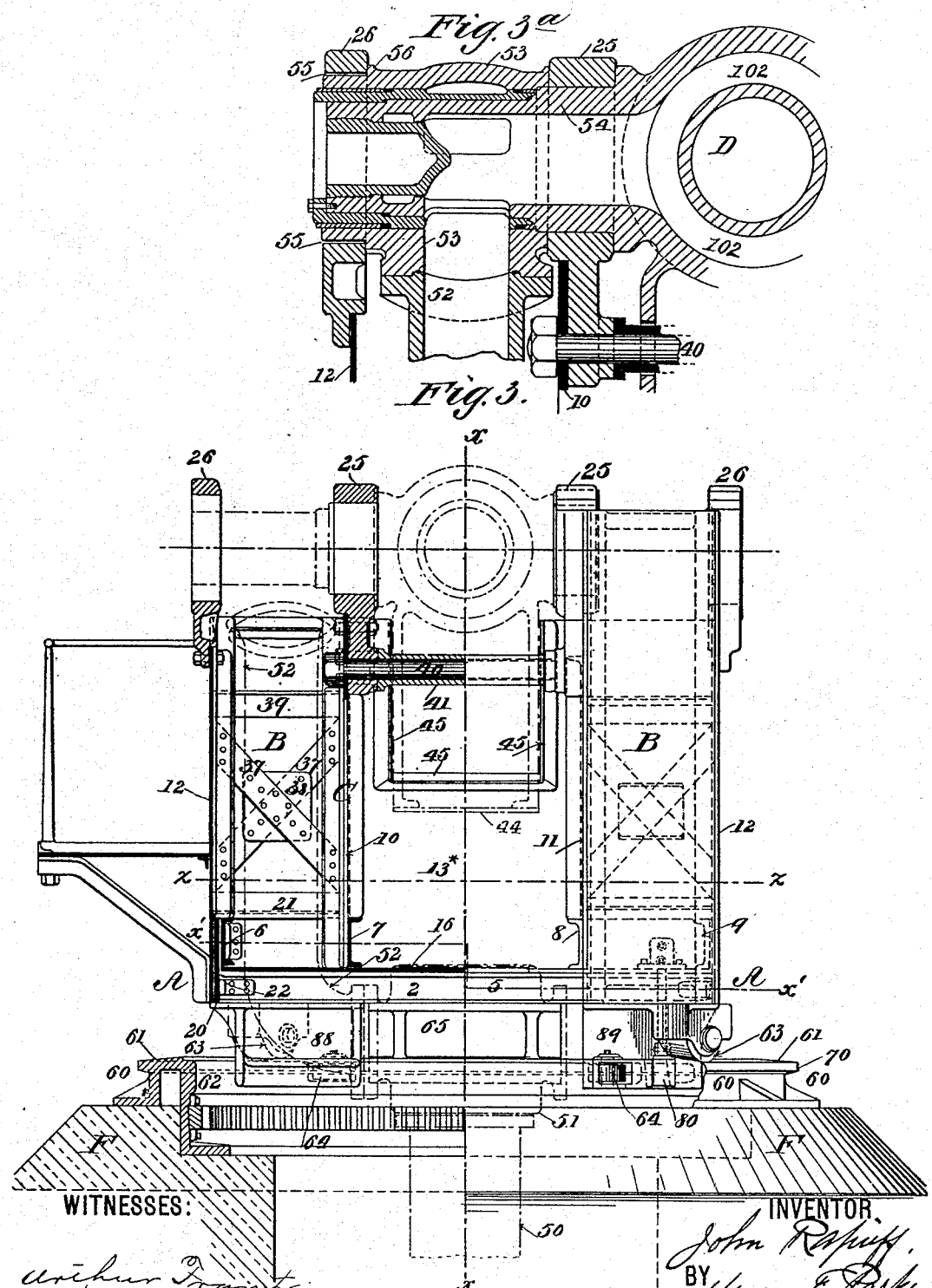
Figure 4:
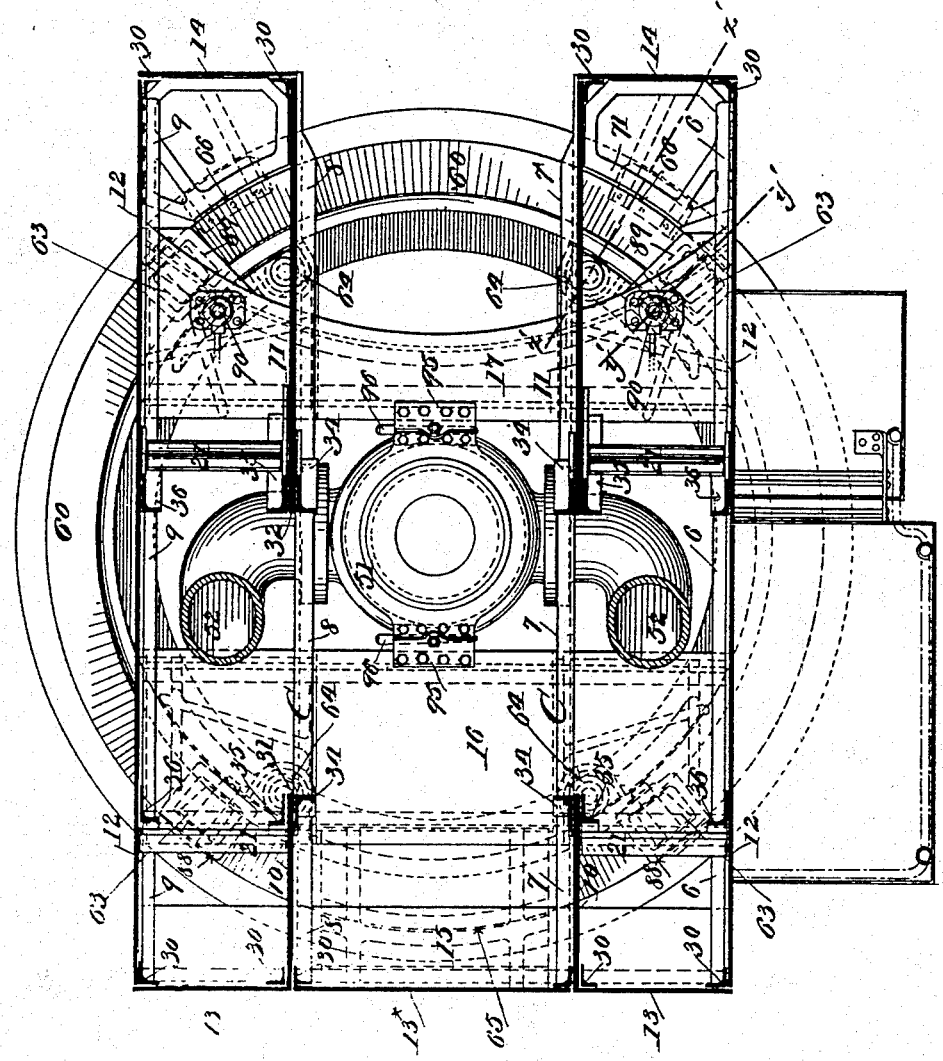

Figure 1, is a side elevation of the carriage; the gun being indicated by broken lines; Fig. 2, a sectional elevation taken on line $x$—$x$ of Fig. 3; the gun being shown partly in elevation; Fig. 3, a rear end elevation of the carriage shown partly in section on the line $y$—$y$, of Fig. 2; Fig. $3^a$, a detail view pertaining to Fig. 3, representing an enlarged section of the trunnion. Fig. 4, is a horizontal section of the carriage taken on the line $z$—$z$, of Figs. 2 and 3; and Fig. 5, a horizontal section of the carriage taken on the line $x'$—$x'$, of Fig. 3. Fig. 6, is an enlarged detail view showing one of the bearing rollers, and one of the recoil wedges in section on the line $y'$—$y'$, of Fig. 4; and Fig. 7, a similarly enlarged detail view showing one of the centering rollers, and one of the holding down hooks in section on the line $z'$—$z'$, of Fig. 4. Figs. 8, and 9, are enlarged detail views, Fig. 8, showing in plan, and Fig. 9 in section (on the line $x^2$—$x^2$, of Fig. 8) respectively, one of the fastenings of the central air pipe swing joint to the carriage.

The principal features of my invention embodying certain novel structural elements in a gun carriage, are applicable to ordnance generally, but especially to pneumatic ordnance wherein the gun itself is of comparatively light construction and the period of recoil is prolonged and cannot be as well resisted by the inertia of a heavy structure as against a sudden projection by explosives. It being unessential therefore to employ a heavy carriage, and the structure herein being of light construction, it remains essential to preserve rigidity; the resistance to the recoil of the gun depending upon the holding down of the carriage to the foundation or circular track in any position to which it is trained, and during the act of projecting.

In effecting these purposes, my invention consists in a gun carriage having trunnion supports of a box form wherein I embody certain novel features of construction adapted to promote rigidity as hereinafter fully set forth.

My invention also consists in conjunction with the gun carriage of a circular track upon which it rests having both a horizontal and a vertical bearing surface or tread, and bearing and centering rollers traveling thereon upon the respective surfaces or treads.

My invention also consists in conjunction with the gun carriage, the circular track, and the said bearing and centering rollers, of a recoil wedge or plurality thereof, actuated when the gun is at rest with reference to its training movement, to lock the carriage firmly in position preparatory to projecting the shell.

My invention also comprises in conjunction with the carriage, the bearing rollers, and the circular track, of holding down hooks, that underlap a projecting flange on the track and secure the carriage against displacement such as would otherwise vary the angle of elevation of the gun by the action of recoil.

My invention also includes certain other novel features pertaining to the gun carriage hereinafter detailed.

I will now proceed to describe the construction of the invention, referring to corresponding parts by similar characters of reference throughout the several views.

A, A, in Figs. 1, 2, 3, and 5, represents the part of the structure composing the base of the carriage, consisting of transverse beams 1, 2, 3, 4, 5, and longitudinal beams 6, 7, 8, 9. These beams which are represented in the form of I beams and channel beams are secured together through the medium of interposed horizontal plates 15, 16, 17, to which they are united, and by which they are braced horizontally, and the base so formed is flanked by reinforcing plates 20, 20, to which the outer longitudinal beams 6, and 9, are secured, as also the extremities of the cross-beams 1, 2, 3, 4, 5, which are fastened thereto by means of brackets 22. There are cross-ties formed of angle bars 21, (see Figs. 2, 3, and 4) connecting the upper portions of the inner longitudinal beams 7 and 8, to the upper portion of the outer ones 6, and 9. The plates 15, 16, 17, Figs. 2, 4, and 5 form platform surfaces for the placing of such mechanical parts as may be attached to the carriage for various purposes, and the intervals between these plates provide for the locating of air pipes and such parts as extend through the base of the carrriage. To the base thus formed, the trunnion supports B, B, Figs. 1, 2 and 3 are secured, and these are composed of main or interior plates 10, 11, of trapezium form or substantially so, which receive the principal strain; exterior plates 12, which flank the carriage; and front and rear cover plates 13, 14, which unite the said interior and exterior plates. Each trunnion support is thereby composed of a rigid box, and upon this is mounted the trunnion bearing 25, pertaining to each side.

As will be hereinafter more particularly described, the entire support of the trunnions and strain of recoil is received upon the bearings 25, Figs. 3 and 3ª while those 26, serve auxiliary purposes. The main or interior plates 10, 11, are riveted to the longitudinal beams 7, 8, Figs. 3, 4 and 5 while the exterior plates 12, are likewise secured to the longitudinal beams 6, and 9 and to the reinforcing plates 20, (Figs. 3 and 5) that are interposed.

Figure 5:
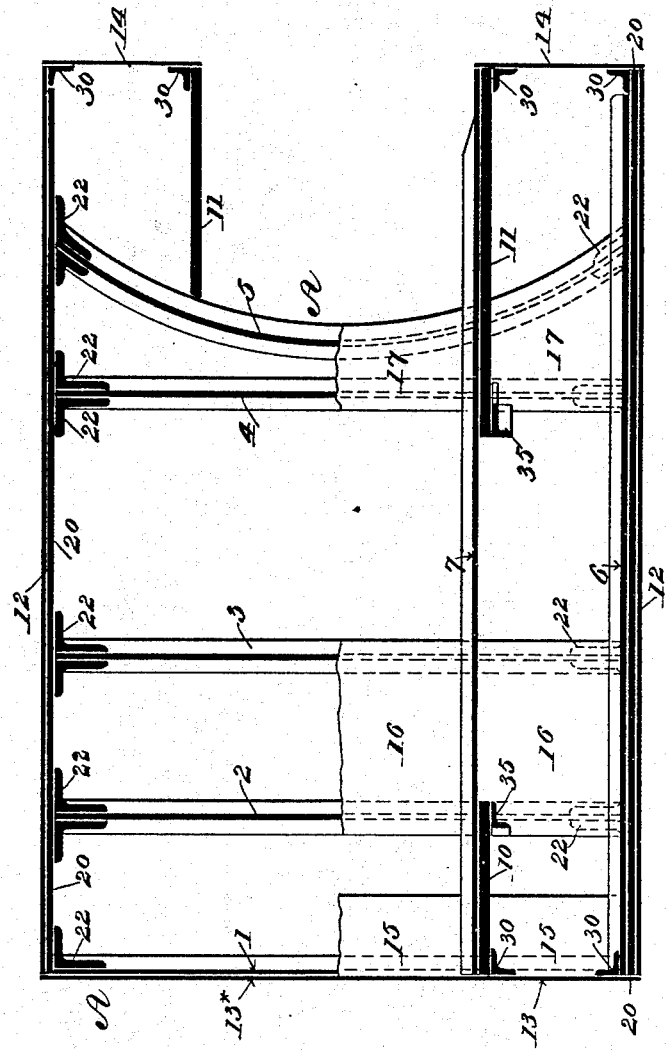

The trapezium shaped main supporting plates 10, and 11 (see Fig. 2) have their edges inclined from the front and rear extremities of the carriage, converged upward toward the trunnion bearings 25; which form is best suited to sustain the recoil, as also the forward reaction of the structure immediately succeeding the recoil. A space or interval C, is left between the edges 31, 32, of the plates 10, 11, and through this opening access is obtained to the interior of the boxes, B, composing the trunnion supports. The edges 31, 32, are bordered by angle iron flanges 34 to stiffen such edges, (see Fig. 4) and the several united edges of all the plates are riveted to angle bars 30, Figs. 2, 4 and 5 usual to iron structural work of the present character. Angle bars 35, Figs. 4 and 5 are also secured to the edges 31, 32 on the sides thereof interior to the box B, and on the interior surface of the plates 12, opposite, there are secured angle bars 36, Fig. 4 parallel to those 35. Cross-braces 37 Fig. 3, are connected to the respective flanges of the angle bars 35, 36, and are united by plates 38. The several various angle bars 30, 34, 35, 36, all serve as part of the supporting structure for the trunnion; said bars composing strong ridges that converge from various parts of the base A—A upward toward the trunnion bearings. The cross-braces contribute largely to the lateral support of the boxes, there being four sets of them one corresponding to each edge 31, or 32, of the main plates 10, 11. In addition to the cross-ties 21, hereinbefore referred to there are also cross-ties 39 Figs. 2 and 3, composed of angle bars which connect the upper central parts of the aforesaid main plates.

The two box-shaped supports B, each as a whole, are connected rigidly together at their upper parts by means of the cross tie or stay bolt 40 Figs. 2 and 3, which extends through the casting of the trunnion bearings 25 (see also Fig. 3ª), and is tightened against its sleeve 41 shown in Fig. 3. The stiffening webs E, of the gun barrel D, are slotted to clear the bolt 40, as seen in Fig. 2, permitting the elevating motion of the gun. As also seen in Fig. 2, the webs E, bear a shield 43, the portion 44, whereof is curved concentrically with the trunnion axis and is designed to protect the gunner in rear of the carriage from small shot. To supplement this shield a plate or web 13*, (see also Fig. 3) integral with the front plates 13, of the boxes B, is extended across the space beneath the shield 44 and the latter being extended rearwardly, always fills the space irrespective of the position of elevation of the gun.

45 in Fig. 3, indicates the edge of the opening in the front shield 13*, showing its form, while the broken lines in said figure indicate the gun and its webs bearing the shield 44.

The air supply pipe 50 Figs. 2, 3, and 4 located in the axis of training, has a swing joint 51 composed of a rotary air belt attached to the carriage, surrounding the upper end of said pipe, into which it opens, and from which belt the pipe branches 52, extend laterally beneath and upward through the box supports B, of the trunnion wherein said pipe branches are inclosed and protected from injury by hostile shot. The upper ends 53, of the pipe branches 52, terminate in collars or air belts, surrounding the hollow trunnions 54, as indicated by dotted lines in Figs. 1, and 2, and more clearly illustrated in enlarged cross-section in Fig. 3ª, and a swing joint as thereby constructed between the trunnion and pipe collar, through which air is conducted to the gun.

As will be understood by an inspection of Figs. 2 and 3ª, the apertures in the trunnions 54, connect with the annular pipe 102, surrounding the barrel D, and this pipe 102, extends to the breech of the gun, as shown in dotted lines in Fig. 2, and the admission of air to the gun barrel D, is controlled by an annular firing valve 104, also indicated by dotted lines and having a construction well known to the art.

As seen by the double lines at 55, in Fig. 3ª, the pipe collar 53, does not bear on the cylindric surfaces of the collar 26, but the latter constitutes a retaining ring for holding the pipe collar against the bearing 25 which sustains the entire weight and recoil of the gun, the ring 26 pressing against the shoulder 56, of the pipe collar, simply retains the joint in its proper position.

60 Figs. 1, 2, 3 and 4 is the circular track concentric with the pivot of the gun, and firmly secured to the solid foundation F, of masonry.

61, is the horizontal or bearing tread of the track; and 62, the centering tread, and 63, the bearing rollers, and 64, the centering rollers; each said roller supported in suitable legs 88, 89 Figs. 2, 3, 6 and 7 secured to the beams 2, 3, and 4, 5, respectively of the base of the carriage.

The principal strain of resistance to the recoil of the gun is received by the legs 89, and by the beams 4, and 5, bearing these legs. The beam 5, is arched in a horizontal plane, as clearly shown in Fig. 5, to sustain this recoil received by the inner vertical plates 11, to which the main trunnion bearings 25, before referred to, are connected. Through the medium of the channel beams 7, and the interposed plate 17, upon the arched beam, the strain is transmitted to the arch at points thereof intermediate to its ends.

65, Figs. 1, and 2, is the front holding down hook, and 66, 66, are the rear holding down hooks; all of which have flanges 67, underlying the projecting flange 70, of the circular track, as will be clearly seen in Fig. 7.

The flanges 67, of the rear hooks are provided with Babbitt or other metal filling which is put in after the gun is set up to form wearing surfaces that shall fit accurately upon the flange 70, which accuracy would be difficult to accomplish, were the fitting dependent on the adjustment of the hooks on the base of the carriage. The single front hook 65, is secured to the beams 1, and 2, and the rear hooks 66, have shanks 71, and flanges 72, whereby they fit and are secured in the open under sides of the rear ends of the boxes B, as best illustrated by Figs. 4 and 7.

80, are the recoil wedges indicated by dotted lines in Fig. 2, and in section in Fig. 6 whereby the gun carriage is secured with reference to the circular track and foundation in any given position of training. The wedges 80, are vertically movable in inclined mortises in the castings which carry the rollers, and the vertical surfaces of the wedges have contact with the vertical or centering tread 62, of the circular track. The wedges are actuated by any suitable mechanical appliance, such for instance as a hydraulic cylinder 90, wherein the piston connected by the piston rod 85, to the wedge 80, is moved up or down at will by induction and eduction of the motive fluid through the pipes 86, 87 in a manner such as fully described in my separate patent application, Serial No. 361,430.

The belt 51, of the air pipe 50, forming the swing joint, is secured to the cross beams 3, and 4, of the base of the carriage as seen in Fig. 4, by means of the device more clearly shown in Fig. 8. This consists of a bracket piece 95, permanently fastened to each said cross beam, provided with a key-way carrying the key 96, and lock bolt 97, therefor. The belt 51, is provided with lugs 98, on opposite sides thereof which are bolted to the brackets 95 by means of loosely fitting bolts 99. When the swing joint is set up, the key 96, is first driven home and the bolts 99, then tightened making a secure joint and facilitating the centering of the swing joints. In this feature of fastening as also in the general construction of all working parts of the gun, the general purpose aimed at is to effect the greatest possible saving of time in taking apart or setting up or substituting any portions of the structure in emergencies where such saving may be of vital importance.

In general operation the gun carriage is made to revolve by means of a motor suitably located on the carriage wherefrom a pinion or pinions also attached to the carriage are driven and engage with the circular rack 100, attached to the foundation F.

What I claim as my invention, and desire to secure by Letters Patent, is—

1. In a gun carriage the combination of a horizonal base substantially as described, and vertical trunnion supports constructed in box form, having interior and exterior plates, and ridges thereon extending from different points in the length of said base in converging lines toward and supporting the trunnions.

2. In a gun carriage the combination of a horizontal base substantially as described, vertical trunnion supporting plates adjacent the gun of substantially trapezium form, bounded by lines converging from different points in the length of said base toward the trunnions, and exterior plates of contour corresponding with the said supporting plates, united thereto by cover plates forming inclosed boxes.

3. The combination with a pneumatic gun, and air supply pipes thereof rising to the trunnions, of a carriage having box-shaped supports consisting of interior and exterior plates inclosing said pipes, and trunnion bearings on the interior plates, and retaining rings on the exterior plates supporting the pipe swing joints of the trunnions between them.

4. The combination with a pneumatic gun, of a pivoted carriage base frame, a pivotal air pipe swing joint having its air belt attached to and rotating with the said frame, pipe branches extending from the air belt laterally and then in vertical planes to the trunnions of the gun, and box-shaped supports for the trunnions inclosing the pipes and confining their upper ends against lateral movement.

5. In a gun carriage, the combination of the base substantially as described, the trapezium shaped interior trunnion supporting plates rising from front and rear portions thereof and having an interval of open space in their length, exterior plates rising from the lateral extremities of the base, corresponding in contour to the foremost and rearmost edges of said interior plates, flanges or ridges on the edges of the interior plates, and flanges or ridges on the exterior plates parallel to those on the interior plates, and connecting ties secured to the said flanges or ridges sustaining the opposite plates in rigid relation.

6. In a gun carriage, the combination of the base substantially as described, the box shaped trunnion supports rising therefrom, trunnion bearings on the inner plates of the boxes, and a transverse stay bolt between said bearings supporting the same and the upper portions of said boxes in rigid relation.

7. The herein described structural elements in a gun carriage, consisting of a base composed of transverse beams longitudinal flanking plates to which their ends are united, longitudinal beams resting on the transverse beams and united thereto through the medium of interposed horizontal plates, and trunnion supports embodying vertical plates connected to and rising from the said longitudinal beams.

8. The combination in a gun carriage of a pivoted base, a flanged circular track concentric with the axis of the carriage having horizontal and vertical treads, bearing and centering rollers on the carriage resting on the respective treads, and holding down hooks arranged substantially as described engaging with the flange of the track.

9. The combination in a gun carriage of a pivoted base, a circular track concentric with the axis of the carriage having horizontal and vertical treads, bearing and centering rollers on the carriage resting on the respective treads, and movable recoil wedges interposed between the vertical tread of the track and a rigid portion of the carriage opposite thereto for the purpose set forth.

10. The combination with the gun carriage, the circular track, and the recoil wedges, of hydraulic or other motive cylinders and pistons therein connected to each wedge for actuating the same automatically by fluid pressure.

11. The combination in a gun carriage having longitudinal and transverse beams forming the base of a transverse arch beam springing from rear portions of the sides of the base in a substantially horizontal plane toward the trunnion supports, which latter are connected to the said arch at points intermediate to its ends substantially as and for the purposes described.

12. The combination in a gun carriage having longitudinal and transverse beams forming its base, of a transverse arch beam receiving the recoil from the trunnion supports, a circular track upon which the carriage is rotative, and centering rollers upon the carriage secured to the lateral portions of the base from whence the said arch springs, bearing upon a vertical face of the track.

13. The combination with a gun carriage, pneumatic gun the circular training track, and the air supply pipe in the axis of training, of the rotary swing joint and fastening therefor to the base of the carriage consisting of brackets in the base of the carriage on diametrically opposite sides of the air belt of said swing joint, corresponding projections on said belt opposite the brackets, movable fastening bolts such as described, and the tightening keys fitting key-ways between the said brackets and projections for the purposes set forth.

14. The combination with the gun carriage flanked by the lateral box trunnion supports, of the front shield 13, and the gun shield 44, concentric with the trunnions adapted to inclose the front of the structure irrespective of the angular elevation of the gun.

JOHN RAPIEFF.

Witnesses:
ARTHUR FRANTZEN,
MARGARET SPENCER.